(12) United States Patent
Yokoyama et al.

(10) Patent No.: US 7,673,900 B2
(45) Date of Patent: Mar. 9, 2010

(54) AIRBAG DEVICE (75) Inventors: Aki Yokoyama, Fuji (JP); Tomoko Ninomiya, Fuji (JP)

(73) Assignee: Nihon Plast Co., Ltd., Fuji-Shi, Shizuoka-Ken (JP)

( * ) Notice: Subject to any disclaimer, the term of this patent is extended or adjusted under 35 U.S.C. 154(b) by 0 days.

(21) Appl. No.: 12/050,484

(22) Filed: Mar. 18, 2008

(65) Prior Publication Data
US 2008/0238060 A1  Oct. 2, 2008

(30) Foreign Application Priority Data
Mar. 30, 2007  (JP) .............................. 2007-095014

(51) Int. Cl.
  *B60R 21/205*  (2006.01)
  *B60R 21/217*  (2006.01)
  *B60R 21/233*  (2006.01)
  *B60R 21/26*   (2006.01)

(52) U.S. Cl. ........................ 280/742; 280/732; 280/736; 280/741; 280/743.2

(58) Field of Classification Search .............. 280/728.1, 280/730.1, 731, 732, 736, 737, 739, 741, 280/742, 743.2
See application file for complete search history.

(56) References Cited

U.S. PATENT DOCUMENTS
7,055,857 B2 *  6/2006  Marotzke ..................... 280/736

FOREIGN PATENT DOCUMENTS
JP        09-156451        6/1997

* cited by examiner

*Primary Examiner*—Ruth Ilan
*Assistant Examiner*—Keith Frisby
(74) *Attorney, Agent, or Firm*—NDQ&M Watchstone LLP (57) ABSTRACT

An airbag device includes an airbag, first and second inflators, a gas-supply mechanism and a release member for connecting between a holding structure and the airbag. Gas generated by the second inflator is supplied into the airbag when the release member is pulled by the airbag while gas generated by the first inflator inflates the airbag. According to the airbag device, a gas amount supplied into an airbag can be switched according to an occupant's seating position without equipping a sensor for measuring a distance between an occupant and the airbag or a control device for computing the gas amount supplied.

4 Claims, 6 Drawing Sheets

AIRBAG DEVICE

BACKGROUND OF THE INVENTION

1. Field of the Invention

The present invention relates to an airbag device installed in a vehicle for restraining an occupant.

2. Description of the Related Art

A conventional airbag device is known, which includes a collision sensor for detecting a collision of a vehicle, an airbag, an inflator for supplying gas into the airbag, a distance sensor for detecting a distance between an occupant and the airbag, and a controller for controlling output of the inflator. In this conventional airbag device, the controller controls the inflator to control an ejected distance of the airbag according to the detection result of the distance sensor, more specifically according to a seating position of the occupant when the collision of the vehicle is detected (for example, Japanese laid-open application publication No. 9-156451).

SUMMARY OF THE INVENTION

The airbag can restrain the occupant adequately by reducing a supplied gas amount into the airbag at the airbag deployment in a case where the occupant is close to the airbag due to an irregular seating position.

A control of a supplied gas amount can be achieved by the above-mentioned conventional airbag device. However, the above-mentioned conventional airbag device needs to be equipped with precision electric devices such as the distance sensor for detecting the distance between the occupant and the airbag and an extra control device for computing to control a supplying gas amount into the airbag. Therefore, the airbag device must be handled with caution at its production, transportation and installation onto the vehicle.

An object of the present invention is to provide an airbag device capable of switching a gas amount supplied into an airbag according to an occupant's seating position without equipping a sensor for measuring a distance between an occupant and the airbag or a control device for computing the gas amount supplied.

An aspect of the present invention provides an airbag device, which includes an airbag; a first gas source for supplying gas into the airbag; a second gas source for generating gas; a supply hole for spouting gas generated by the second gas source; an extendable member which moves the supply hole from a preventing position to a supplying position by an urging force during a transformation from a compressed state to an extended state thereof; a gas-supply mechanism which includes the supply hole and the extendable member and is switched by the urging force from a preventing state to a supplying state; a holding structure for holding the gas-supply mechanism in the preventing state against the urging force; and a release member which connects between the holding structure and the airbag and can release the preventing state of the gas-supply mechanism by the holding structure when being pulled. In the preventing state, the supply hole is in the preventing position and gas generated by the second gas source is prevented to be supplied into the airbag. In the supplying state, the supply hole is in the supplying position and gas generated by the second gas source is supplied into the airbag. The gas-supply mechanism in the supplying state supplies gas generated by the second gas source into the airbag when the release member is pulled by the airbag.

It is preferable to utilize a gas tank which has a space therein. The gas tank is supplied with gas generated by the second gas source and can be communicated with the inside of the airbag when the release member is pulled by the airbag.

It is further preferable that the gas-supply mechanism further includes a container for containing the gas tank having an exhaust hole which is communicated with the supply hole in the preventing position to exhaust gas from the supply hole, and the supply hole in the supplying position is positioned in the outside of the container.

It is further preferable that the holding structure includes a restraint member provided within the airbag and a wedged member which is wedged between the restraint member and the gas tank with the extendable member being in the compressed state, one end of the release member is connected to the wedged member, and the extendable member transforms from the compressed state to the extended state when the release member pulled by the airbag dislodges the wedged member between the restraint member and the gas tank while the airbag inflates.

It is further preferable that the airbag includes an opening, the holding structure includes a fixing member for closing the opening and fixing one end of the release member to a circumferential opening edge of the opening and a restraint portion which is positioned around the opening and is contacted with the gas tank to hold the extendable member in the compressed state, and the extendable member transforms from the compressed state to the extended state when the release member pulled by the airbag releases a closure of the opening by the fixing member while the airbag inflates.

It is preferable that the release member is ribbon-shaped or string-shaped.

According to the airbag device of the present invention, a supplying gas amount into an airbag can be switched over according to an occupant's seating position without equipping a sensor for measuring a distance between an occupant and the airbag or a control device for computing the supplying gas amount.

DETAILED DESCRIPTION OF THE EMBODIMENT

A first embodiment of the present invention will be described with reference to FIGS. 1 to 6. The present embodiment is an example applied with an airbag device installed onto a vehicle (an automobile).

Figure 1:
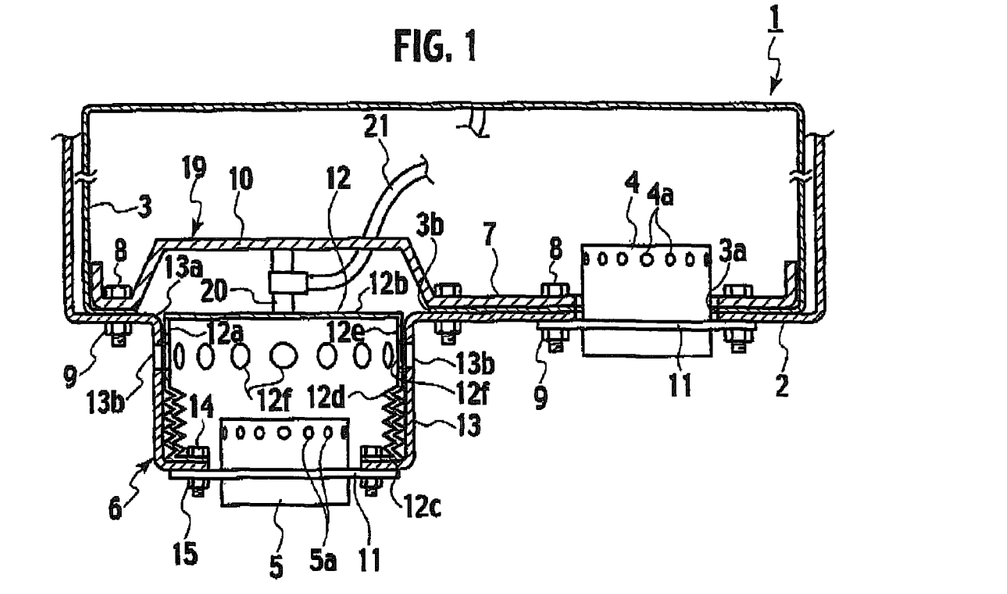
FIG. 1 is a cross-sectional view of an airbag device according to a first embodiment of the present invention.
Figure 2:
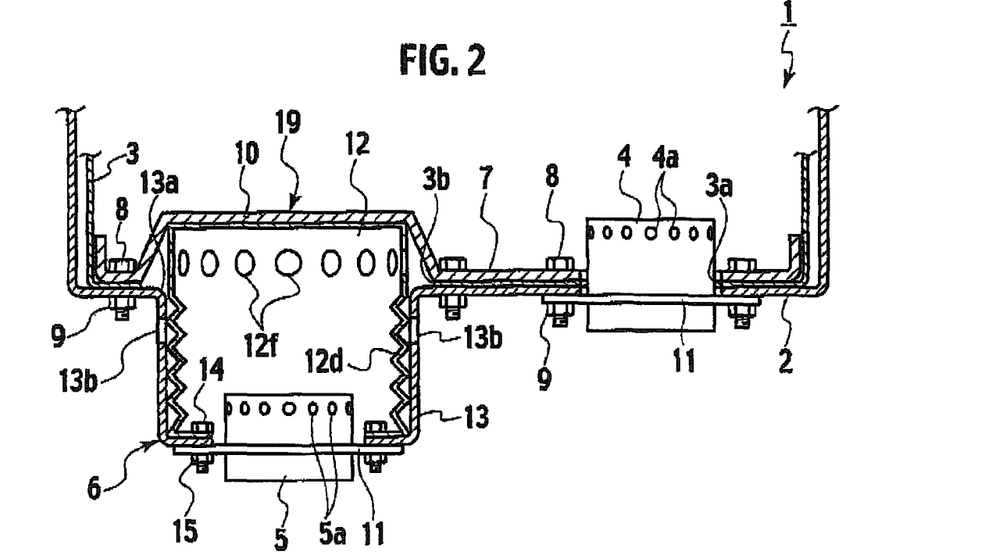
FIG. 2 is a cross-sectional view of the airbag device of the first embodiment with a gas supply mechanism being in a gas-supply state.

As shown in FIGS. 1 and 2, the airbag device 1 includes a housing 2, an airbag 3 stowed within the housing 2, a first inflator (a first gas source) 4 for supplying gas into the airbag 3, a second inflator (a second gas source) 5 and a gas-supply mechanism 6 for supplying gas generated by the second inflator 5 to an inside or an outside of the airbag 3.

The airbag 3 is stowed in the housing 2 in a folded state folded. Note that folding of the stowed airbag 3 is not drawn in detail in the drawings. The airbag 3 includes a first opening 3a, a second opening 3b and vent holes (not shown).

A retaining plate 7 is provided inside the airbag 3. The retaining plate 7 is fastened onto the housing 2 with bolts 8 and nuts 9. The airbag 3 is retained between the retaining plate 7 and the housing 2 to be fixed onto the housing 2. A restraint member 10 bridging the second opening 3b is integrally provided with the retaining plate 7.

The first inflator 4 has a cylindrical outer form. The first inflator 4 includes a first plurality of exhaust holes 4a for spouting gas. The first inflator 4 is fixed onto the housing 2 via a flange 11 by the bolts 8 and the nuts 9. The flange 11 extends outward from an outer circumferential surface of the first inflator 4.

The second inflator 5 has a cylindrical outer form. The second inflator 5 includes a second plurality of exhaust holes 5a for spouting gas.

The gas-supply mechanism 6 transforms by an after-mentioned extendable member 12d from a preventing-state, in which gas generated by the second inflator 5 is prevented to be supplied into the airbag 3, to a supplying-state, in which the gas is supplied into the airbag 3. The gas-supply mechanism 6 is in the preventing-state under non-operation (non-collision).

Specifically, the gas-supply mechanism 6 includes a gas tank 12 into which gas generated by the second inflator 5 is supplied and a tank container 13 for containing the gas tank 12.

The tank container 13 is provided with the housing 2 integrally and has a space therein for containing the gas tank 12. The tank container 13 includes an opening 13a communicating with the second opening 3b of the airbag 3. In addition, a plurality of exhaust holes 13b is provided on a circumferential wall of the tank container 13.

Figure 3:
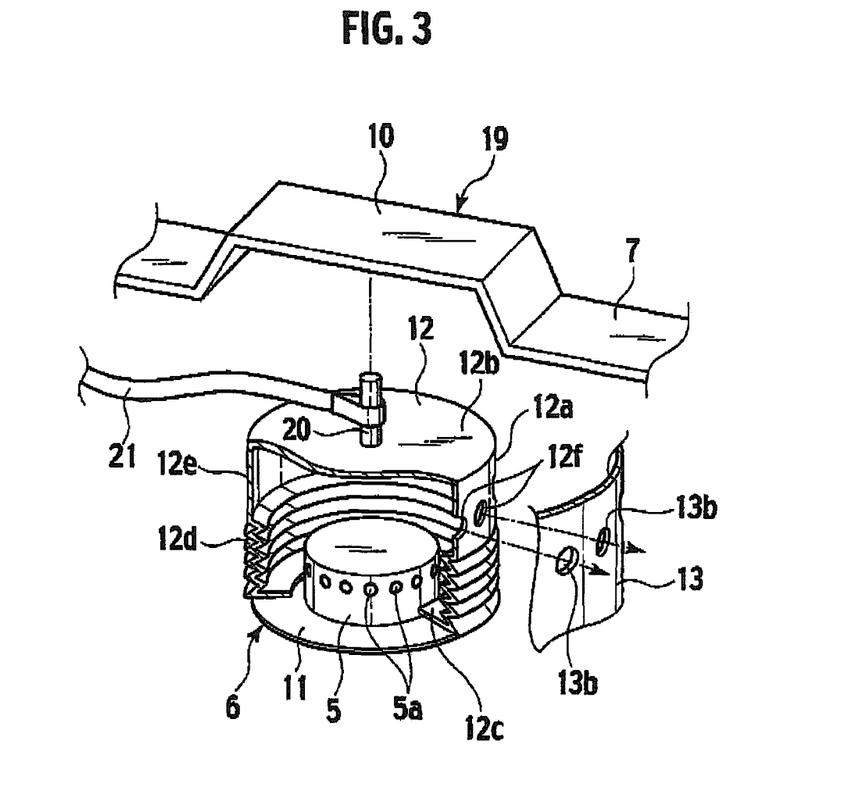
FIG. 3 is an exploded perspective view of a second inflator and its surroundings in the first embodiment of the present invention.

As shown in FIG. 3, the gas tank 12 includes a cylindrical circumferential wall 12a, a first closing wall 12b for closing one open end of the circumferential wall 12a and a second closing wall 12c for closing another open end of the circumferential wall 12a, and has a cylindrical shape closed at both ends. The circumferential wall 12a and the first closing wall 12b are made integrally. The second closing wall 12c is made separately from the circumferential wall 12a and the first closing wall 12b and then coupled with them.

The second inflator 5 is attached to the second closing wall 12c with its center being passed therethrough. The second plurality of exhaust holes 5a of the second inflator 5 is within the gas tank 12. As shown in FIG. 1, a bottom wall of the tank container 13 is sandwiched between the second closing wall 12c and a flange 11 of the second inflator 5 and these three parts are fastened together by bolts 14 and nuts 15. The gas tank 12 is fixed onto the tank container 13 by the above-described structure. Note that the second inflator 5 passes through the bottom wall.

As shown in FIG. 3, the circumferential wall 12a is composed of the almost cylindrical extendable member 12d which can extend and shrink and a cylindrical supply-hole member 12e which is coupled with the extendable member 12d.

A plurality of supply holes 12f are provided on the supply-hole member 12e along a circumferential direction. Gas generated by the second inflator 5 is spouted out from the plurality of supply holes 12f via the inside of the gas tank 12.

The extendable member 12d is an accordion-bent member which functions as a compression spring. The extendable member 12d moves the plurality of supply holes 12f from a preventing position (FIG. 1) to a supplying position (FIG. 2) during the transformation from a compressed state to an extended state thereof. When the plurality of supply holes 12f is in the preventing position, the plurality of supply holes 12f is communicated with the plurality of exhaust holes 13b, respectively. When the plurality of supply holes 12f is in the supplying position, the plurality of supply holes 12f is in the outside of the tank container 13 in order that gas may be supplied into the airbag 3 via the plurality of supply holes 12f. In the present embodiment, when the plurality of supply holes 12f is in the supplying position, the plurality of supply holes 12f is completely within the airbag 3. When the gas-supply mechanism 6 is in the preventing state, the plurality of supply holes 12f is in the preventing position. When the gas-supply mechanism 6 is in the supplying state, the plurality of supply holes 12f is in the supplying position.

In addition, as shown in FIG. 1, the airbag device 1 is provided with a holding structure 19 for holding the gas-supply mechanism 6 in the preventing state against an urging force of the extendable member 12d.

The holding structure 19 includes the restraint member 10 and a wedged member 20 to be wedged between the restraint member 10 and the gas tank 12 with the extendable member 12d being in the compressed state.

The wedged member 20 has a rod-shape. A flexible release member 21 is connected to the wedged member 20.

The release member 21 has a ribbon-shape. One end of the release member 21 is connected to the wedged member 20 and another end is connected to an inner surface of the airbag 3. In other words, the release member 21 connects between the holding structure 19 and the airbag 3. The release member 21 can release the preventing state of the gas-supply mechanism 6 by the holding structure 19 when the release member 21 is pulled.

Figure 4:
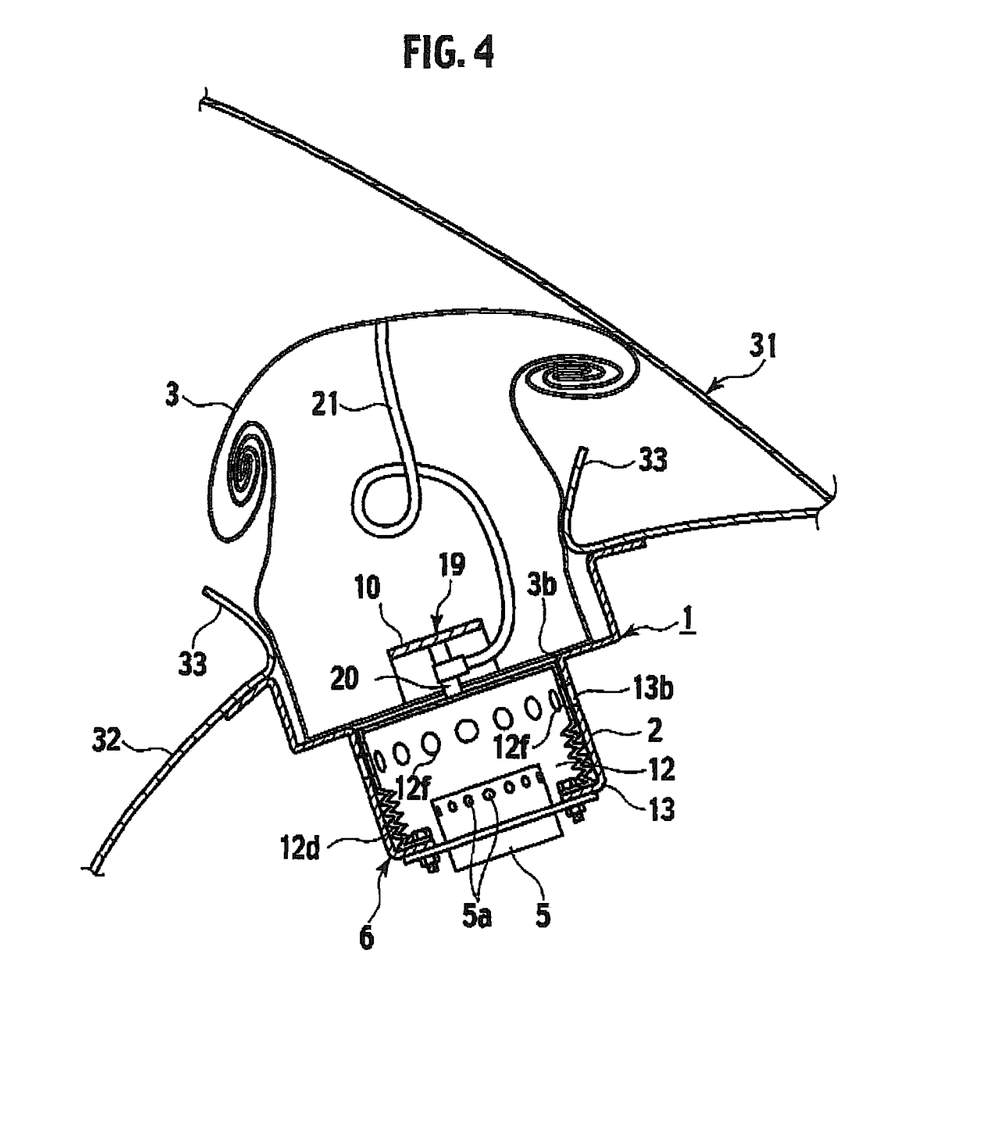
FIG. 4 is a longitudinal cross-sectional view of the airbag device installed onto a vehicle in the first embodiment of the present invention.

As shown in FIG. 4, the airbag device 1 is installed within a dashboard 32 in front of a passenger seat of the automobile 31. A door 33 is provided on the dashboard 32, which is torn to be opened by an inflation force of the airbag 3.

According to the above-described configuration, the gas-supply mechanism 6 is in the preventing state during the non-collision state of the automobile 31 (FIG. 1). When a collision-detecting sensor (not shown) has detected a collision of the automobile 31 against an obstacle, a detection signal is transmitted from the collision-detecting sensor to the first and second inflators 4 and 5. The first and second inflators 4 and 5 start to generate gas when the detection signal is received (FIG. 4). In detail, the second inflator 5 starts to generate gas after predetermined time has passed since the first inflator 4 starts to generate gas. Note that the first inflator 4 is omitted to be drawn in FIGS. 4 and 5. Gas generated by the first inflator 4 is supplied into the airbag 3. Otherwise, gas generated by the second inflator 5 and spouted into the inside of the gas tank 12 is supplied to the outside of the airbag 3 through the plurality of supply holes 12f and the plurality of exhaust holes 13b. Therefore, gas generated by the second inflator 5 is not supplied into the airbag 3. In other words, gas generated by the first inflator 4 is only supplied into the airbag 3 in this state. And then, the inflating airbag 3 opens the door 33 on the dashboard 32 to deploy toward a cabin space.

Operations of the airbag device 1 in two situations after the above-mentioned state will be explained hereinbelow. One situation is that an occupant 41 is seated in a regular seating position. Another situation is that an occupant 41 is seated in an irregular seating position with being close to the airbag device 1.

Figure 5:
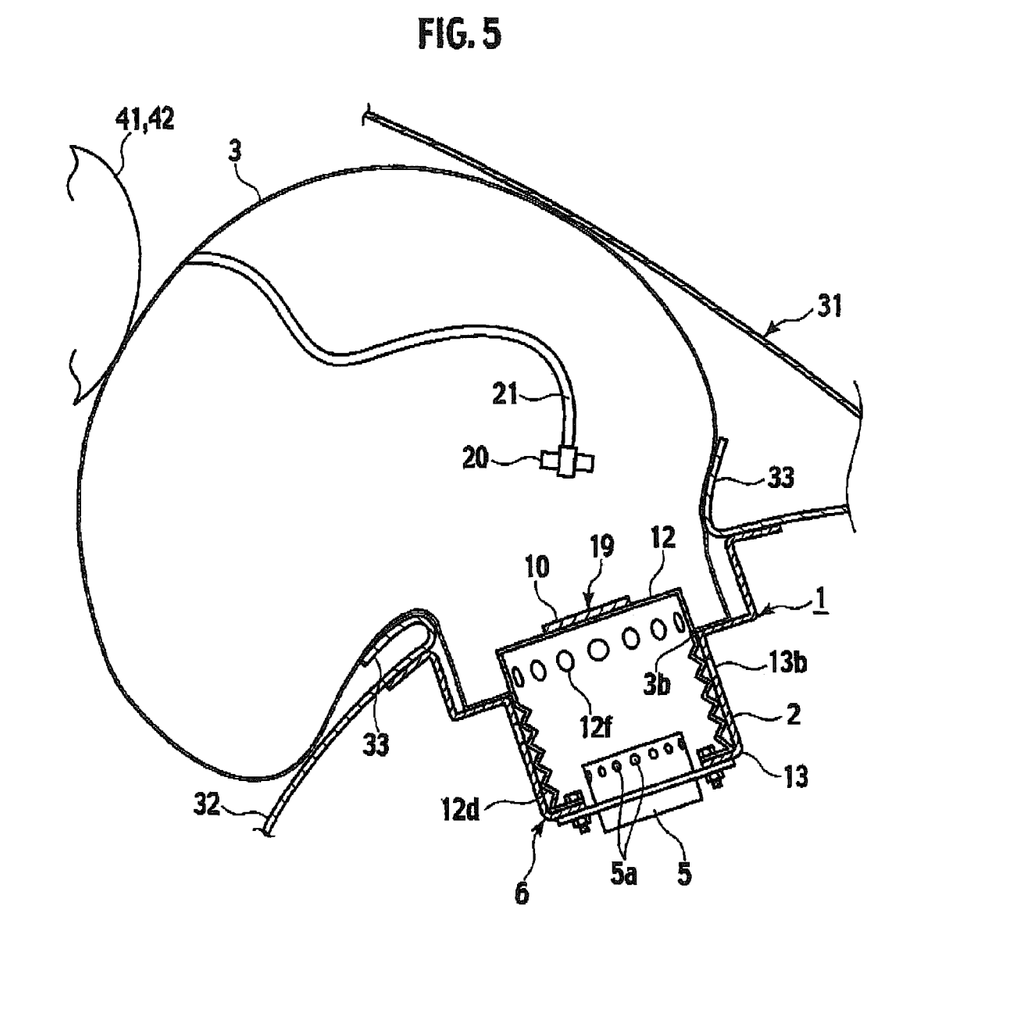
FIG. 5 is a longitudinal cross-sectional view of the airbag device with the airbag fully inflating in the first embodiment of the present invention.

First, in the situation where the occupant 41 is seated in a regular seating position, the release member 21 is pulled by the airbag 3 and then the wedged member 20 between the restraint member 10 and the gas tank 12 is dislodged while gas generated by the first inflator 4 inflates the airbag 3. As a result, the preventing state of the gas-supply mechanism 6 by the holding structure 19 is released and then the extendable member 12d transforms from the compressed state to the extended state. The plurality of supply holes 12f is moved from the preventing position to the supplying position. In other words, the gas-supply mechanism 6 is moved from the preventing state to the supplying state (FIG. 5). Therefore, gas, which is generated by the second inflator 5 and is spouted through the second plurality of exhaust holes 5a, is supplied into the airbag 3 via the plurality of supply holes 12f. In this manner, the airbag 3 into which gas generated by the first and second inflators 4 and 5 has been supplied is inflated into a regular full-inflated state to be able to restrain a head 42 of the occupant 41 seated in a regular seating position. In this state, a preferred inner pressure of the airbag 3 is 400 to 500 kPa. A preferred proportion of gas supplied into the airbag 3 is (the first inflator 4):(the second inflator 5)=50:50 to 80:20.

Figure 6:
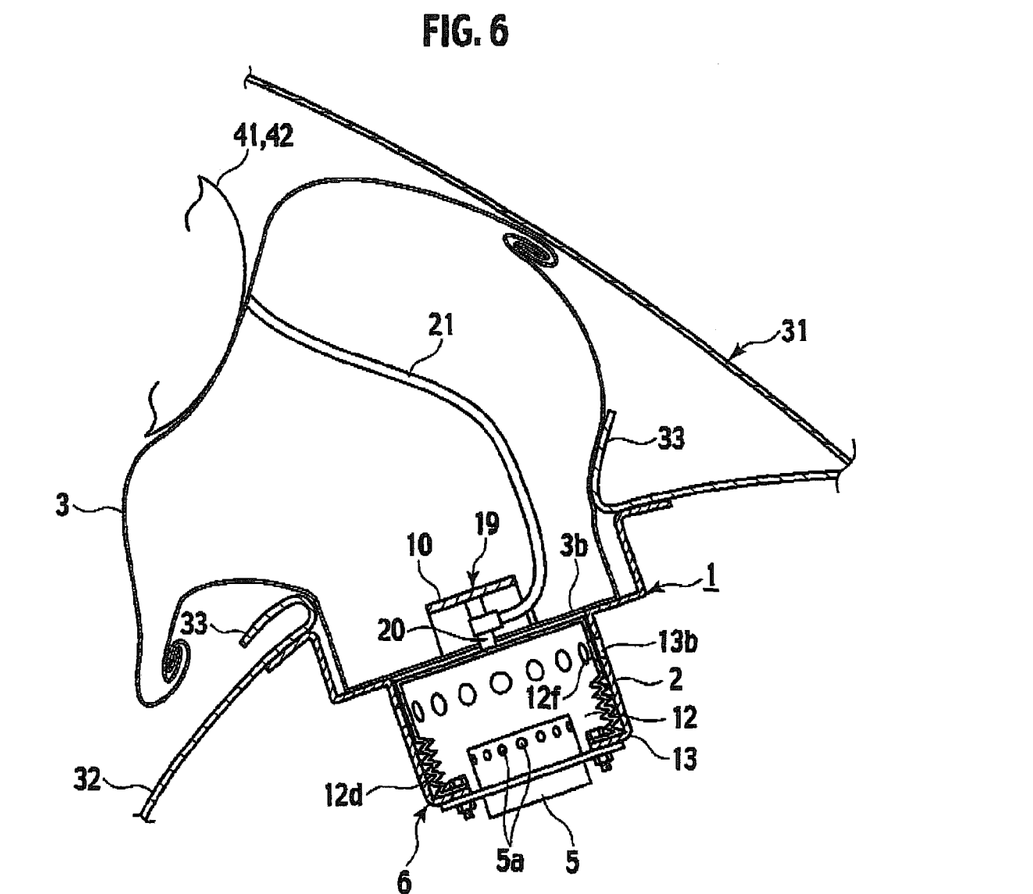
FIG. 6 is a longitudinal cross-sectional view of the airbag device with the airbag restrained to inflate by an occupant in the first embodiment of the present invention.

Next, the situation is explained where an occupant 41 is seated in an irregular seating position close to the airbag device 1. In this case, as shown in FIG. 6, the inflation of the airbag 3 is restrained by the occupant 41 contacted with the airbag 3 while gas generated by the first inflator 4 inflates the airbag 3. Therefore, pulling of the release member 21 by the airbag 3 is restrained. If the wedged member 20 between the restraint member 10 and the gas tank 12 is not lodged, the preventing state of the gas-supply mechanism 6 by the holding structure 19 is kept. Therefore, since the gas-supply mechanism 6 is still in the preventing state, gas generated by the second inflator 5 is not supplied into the airbag 3. As a result, an inflating amount of the airbag 3 become adequately less than a regular full-inflating amount to be able to restrain a head 42 of the occupant 41 seating close to the airbag device 1 more adequately in comparison with a conventional device.

As described above, according to the airbag device 1 of the present embodiment, a gas amount supplied into the airbag 3 can be switched according to the position of the occupant 41 without equipping a sensor for measuring a distance between the occupant 41 and the airbag 3 or a control device for computing the gas amount supplied.

In addition, according to the present embodiment, since the gas tank 12 is provided, it can be switched whether or not gas generated by the second inflator 5 is supplied into the airbag 3 without moving the second inflator 5.

In addition, according to the present embodiment, since the gas tank 12 is contained in the tank container 13, the gas tank 12 can be protected by the tank container 13.

In addition, according to the present embodiment, since the release member 21 has a ribbon-shape (or a string-shape), the release member 21 can be practically provided with ease.

Hereinafter, a second embodiment of the present invention will be described with reference to FIGS. 7 and 8. Note that an airbag device 1A of the present embodiment has similar constituent elements as the airbag device of the first embodiment. Therefore, repetitive descriptions of identical or similar elements between the embodiments will be omitted with identical numerals thereof.

Figure 7:
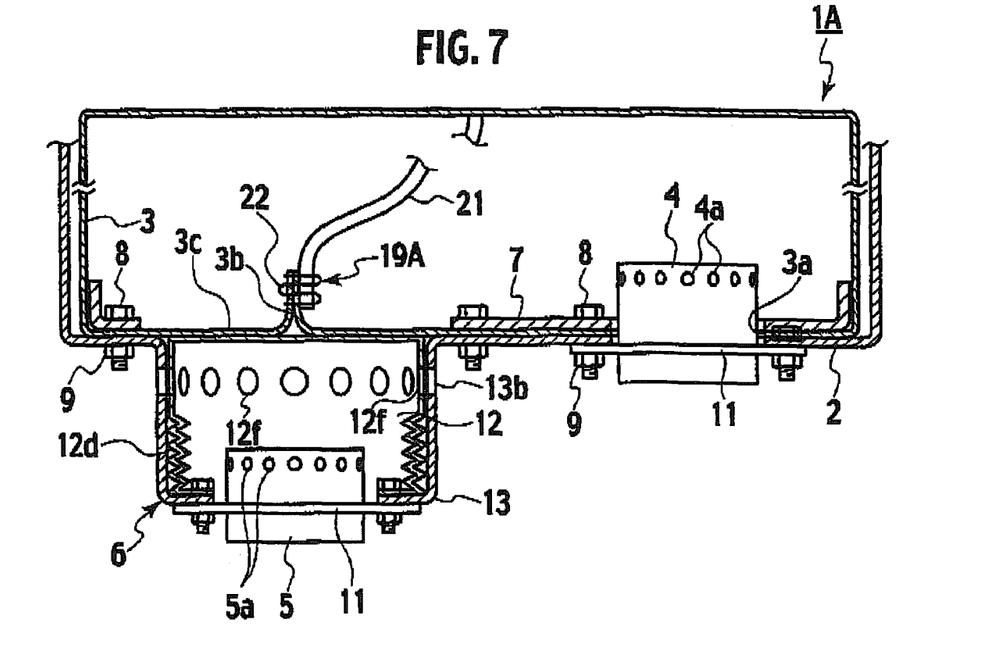
FIG. 7 is a cross-sectional view of an airbag device according to a second embodiment of the present invention.
Figure 8:
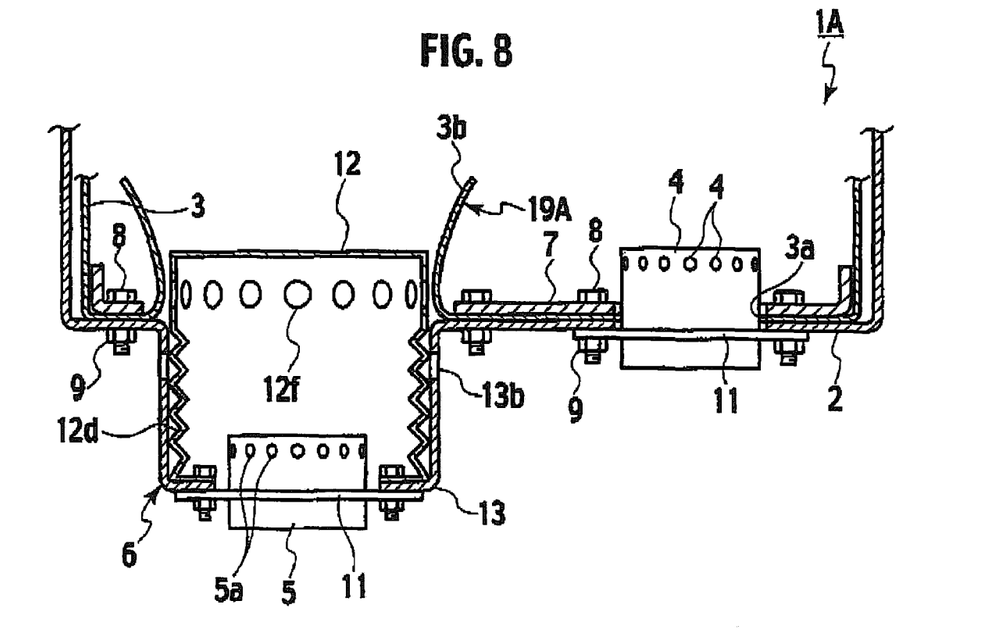
FIG. 8 is a cross-sectional view of the airbag device of the second embodiment with a gas supply mechanism being in a gas-supply state.

As shown in FIGS. 7 and 8, a featuring difference between the present embodiment and the first embodiment is a holding structure 19A. The holding structure 19A of the present embodiment includes a string (fixing member) 22 for closing the second opening 3b of the airbag 3 and fixing one end of the release member 21 to a circumferential opening edge of the second opening 3b. The airbag 3 and the release member 21 are sewed by the string 22. In addition, the holding structure 19A includes a restraint portion 3b which exists around the opening edge of the second opening 3b and is contacted with the gas tank 12 to hold the extendable member 12 in the compressed state.

According to the above-described configuration, the gas-supply mechanism 6 is in the preventing state during the non-collision state of the automobile 31. When a collision-detecting sensor has detected a collision of the automobile 31 against an obstacle, a detection signal is transmitted from the collision-detecting sensor to the first and second inflators 4 and 5. The first and second inflators 4 and 5 start to generate gas when the detection signal is received. Similarly to the first embodiment, gas generated by the first inflator 4 is supplied into the airbag 3 and gas generated by the second inflator 5 is supplied outside the airbag 3. And then, the inflating airbag 3 opens the door 33 on the dashboard 32 to deploy toward a cabin space.

Operations of the airbag device 1A in two situations after the above-mentioned state will be explained hereinbelow. One situation is that an occupant 41 is seated in a regular seating position. Another situation is that an occupant 41 is seated in an irregular seating position close to the airbag device 1A.

First, in the situation where the occupant 41 is seated in a regular seating position, the release member 21 is pulled by the airbag 3 and then the string 22 is pulled out or torn while gas generated by the first inflator 4 inflates the airbag 3. As a result, the second opening 3b of the airbag 3 is opened and then the preventing state of the gas-supply mechanism 6 by the holding structure 19 is released. The gas tank 12 is extended toward the second opening 3b by an urging force of the extendable member 12d and then the plurality of supply holes 12f is moved to the supplying position. In the present embodiment, the plurality of supply holes 12f is surrounded by the restraint portion 3c in the supplying position. Gas, which is generated by the second inflator 5 and is spouted through the second plurality of exhaust holes 5a, is supplied into the airbag 3 via the plurality of supply holes 12f in this state. In this manner, the airbag 3 into which gas generated by the first and second inflators 4 and 5 has been supplied is inflated into a regular full-inflated state to be able to restrain a head 42 of the occupant 41 seated in a regular seating position.

Next, the situation is explained where an occupant 41 is seated in an irregular seating position close to the airbag device 1A. In this case, the inflation of the airbag 3 is restrained by the occupant 41 contacted with the airbag 3 while gas generated by the first inflator 4 inflates the airbag 3. Therefore, pulling of the release member 21 by the airbag 3 is restrained. If the string 22 is not pulled out (torn), the preventing state of the gas-supply mechanism 6 by the holding structure 19A is kept. Therefore, gas generated by the second inflator 5 is not supplied into the airbag 3. As a result, an inflating amount of the airbag 3 becomes adequately less than a regular full-inflating amount to be able to restrain a head 42 of the occupant 41 seated close to the airbag device 1A more adequately in comparison with a conventional device.

The present invention is not limited to the above embodiments and may be modified to other embodiments within a scope of the present invention. For example, each of the first and second inflators 4 and 5 has a cylindrical shape with a longer radial dimension than an axial dimension in the above embodiments. However, the cylindrical shape is not limited to this and may include a flat so-called disk shape which has the further longer radial dimension than the axial dimension. Otherwise, it may be an elongated shape with a longer axial dimension than a radial dimension or a shape with identical radial and axial dimensions. Furthermore, each shape of the first and second inflators 4 and 5 is not limited to a cylindrical shape and may be applied in various shapes. For example, each of the first and second inflators 4 and 5 may be rounded at its end(s).

In addition, the first and second inflators 4 and 5 are provided one by one in the above embodiments. However, a plurality of first inflators 4 may be provided and also a plurality of second inflators 5 may be provided. In this case, the gas-supply mechanism 6, the holding structure 19 or 19A and the release member 21 may be provided with each of the plurality of second inflators 5. In addition, in a case where the plurality of second inflators 5 are provided, each release timing from the preventing state of the gas-supply mechanisms 6 may be differentiated by differentiating each fixing point or each length of the release members 21.

In addition, the first gas source (the first inflator 4) and the second gas source (the second inflator 5) are provided separately in the above embodiments. However, the first gas source and the second gas source may be provided integrally.

In addition, the release member 21 is made of single ribbon-shaped element in the above embodiments. However, the release member 21 may be a mechanism composed of plural elements.

In addition, the extendable member 12d is the accordion-bent member in the above embodiments. However, the extendable member 12d may be an extendable (and shrinkable) mechanism composed of plural elements which can be relatively displaced with respect to each other.

What is claimed is:

1. An airbag device, comprising:
    an airbag;
    a first gas source for supplying gas into the airbag;
    a second gas source for generating gas;
    a supply hole for spouting gas generated by the second gas source;
    an extendable member which moves the supply hole from a preventing position to a supplying position by an urging force during a transformation from a compressed state to an extended state thereof;
    a gas-supply mechanism which includes the supply hole and the extendable member, the gas supply mechanism being switched by the urging force from a preventing state to a supplying state, the supply hole maintaining the preventing state and such that gas generated by the second gas source is prevented from being supplied into the airbag, and the supply hole assuming the supplying state such that gas generated by the second gas source is supplied into the airbag;
    a holding structure for holding the gas-supply mechanism in the preventing state against the urging force; and
    a release member connected between the holding structure and the airbag, the release member releasing the preventing state of the gas-supply mechanism maintained by the holding structure when pulled,
    wherein the gas-supply mechanism assumes the supplying state to supply gas generated by the second gas source into the airbag when the release member is pulled by the airbag; and,
    wherein the gas-supply mechanism includes a gas tank having a space therein, the gas tank supplied with gas generated by the second gas source, the gas tank communicating with the inside of the airbag when the release member is pulled by the airbag; and,
    wherein the gas-supply mechanism further includes a container for containing the gas tank, the container having an exhaust hole maintaining communication with the supply hole in the preventing state to exhaust gas from the supply hole, and
    wherein the supply hole, in the supplying state, is positioned outside of the container.

2. The airbag device according to claim 1, wherein
    the holding structure includes a restraint member provided within the airbag and a wedged member which is wedged between the restraint member and the gas tank with the extendable member being in the compressed state,
    one end of the release member is connected to the wedged member, and
    the extendable member transforms from the compressed state to the extended state when the release member pulled by the airbag dislodges the wedged member between the restraint member and the gas tank while the airbag inflates.

3. The airbag device according to claim 1, wherein
    the airbag includes an opening,
    the holding structure includes a fixing member for closing the opening and fixing one end of the release member to a circumferential opening edge of the opening and a restraint portion which is positioned around the opening and is contacted with the gas tank to hold the extendable member in the compressed state, and
    the extendable member transforms from the compressed state to the extended state when the release member pulled by the airbag releases a closure of the opening by the fixing member while the airbag inflates.

4. The airbag device according to claim 1, wherein
    the release member is ribbon-shaped or string-shaped.

* * * * *